Figure 1:
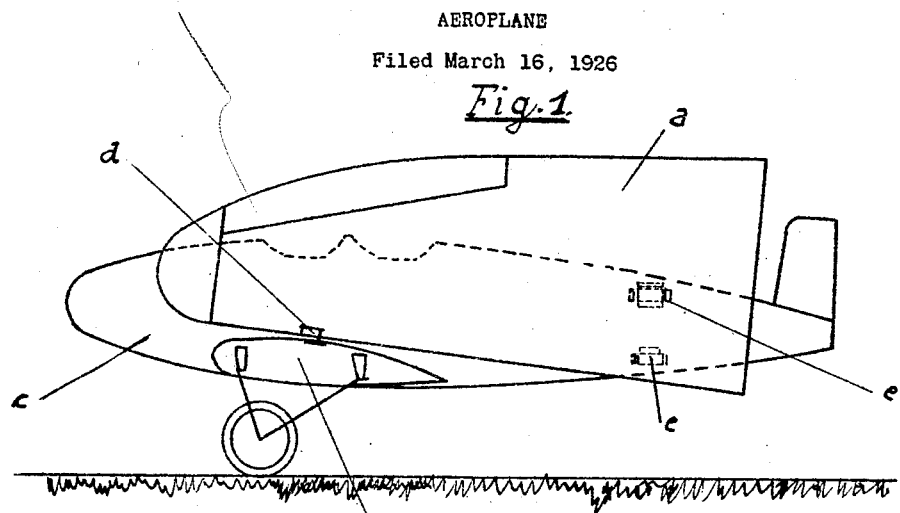

Oct. 19, 1926.

H. KLEMM

AEROPLANE

Filed March 16, 1926

1,603,697

Inventor.

Patented Oct. 19, 1926.

1,603,697

UNITED STATES PATENT OFFICE.

HANNS KLEMM, OF SINDELFINGEN, GERMANY, ASSIGNOR TO DAIMLER MOTOREN GESELLSCHAFT, OF STUTTGART-UNTERTURKHEIM, GERMANY, A CORPORATION OF GERMANY.

AEROPLANE.

Application filed March 16, 1926, Serial No. 95,142, and in Germany February 2, 1925.

This invention relates to an aeroplane in which the wings are detachable in order to facilitate transport or modification of the wing area.

The invention differs from known arrangements of this kind, in that the removable wing members are detached from a continuous central member, which remains attached to the fuselage, and, furthermore, in that said central member serves for the attachment of the under carriage. Moreover, according to the invention, the wing stumps projecting from the fuselage are employed for supporting and retaining the wings when set upon edge. With this object, that portion of the wing which is supported on the wing stump, is provided with a ball head, adapted to engage in a corresponding gap provided in the stump or vice-versa and communicating with a narrow slot. The other extremity of the wing is provided with angles for suspending same in the rear portion of the fuselage. The retention of a continuous wing member on the fuselage offers the advantage of facilitating the attachment of the under carriage, especially in aeroplanes of small dimensions, and of increasing the strength of the apparatus, besides enabling the detached and uptilted wings to be attached to and supported by the fuselage in the simplest manner. The simple attachment of the detached wing members to the fuselage has the further advantage that the attachment and removal takes up very little time. The occurrence of mishaps is also practically excluded because the fastening means consist of simple rigid clamps which render any special securing devices unnecessary.

An embodiment of the invention is diagrammatically illustrated in the drawing by three figures.

Figure 2:
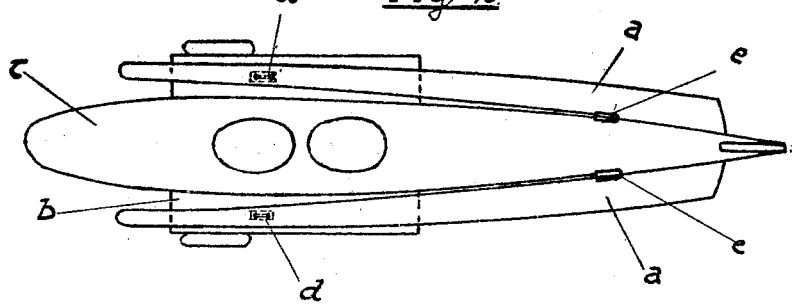
Figure 3:
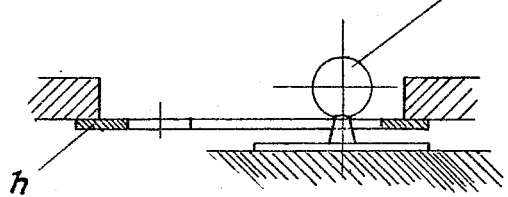
Figure 5:
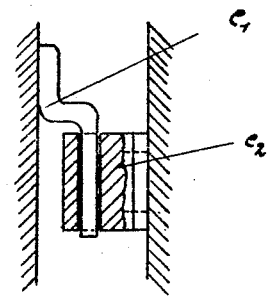
Figure 4:
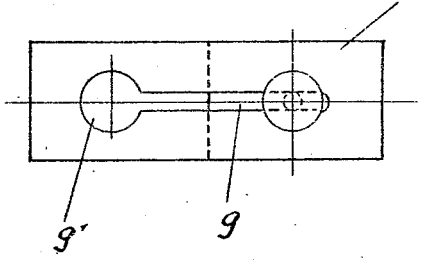

Figure 1 is an elevation of the aeroplane with the lateral wing members detached from the central member. Figure 2 is a plan of same. Figure 3 is a sectional view of a holder for the lateral wing members when detached from the central member. Figure 4 is a plan of same. Figure 5 shows a sectional view of another holder for the lateral wing members when detached from the central member.

The sectional wing members $a$ are separate from the central member $b$ which is attached to the fuselage $c$. The central member serves to carry the under-carriage, and also as a support for the detached wing members after the same have been set up on edge. The one end of the sectional wing member is attached to the central member by a device $d$, whilst two fastening members $e$ are provided on the fuselage $c$ for the other end.

The fastening member $d$, which is shown on a larger scale in Figures 3 and 4, consists of a ball-headed holder $f$ which, in the embodiment shown, is mounted on the central wing member. The ball-head of the holder $f$ engages in a slot $g$ in a plate $h$ which, in the embodiment shown, is mounted on the edge of the lateral wing member. In order to enable the head of the holder $f$ to be slipped into the slot, the latter is provided with a gap $g^1$ of correspondingly larger dimensions.

The fastening members $e$ at the other end of the lateral members consist—as shown on a larger scale in Figure 5—of simple angles with hooks $e^1$ and eyes $e^2$.

The relative positions of the fastenings $d$ and $e$ $e$ may also be different from those represented.

I claim:

1. In an aeroplane a fuselage, a central wing member attached thereto and projecting beyond the sides thereof, lateral wing members and means for detachably securing said lateral wing members to the central wing member, means for attaching the under-carriage to said central wing member and devices for supporting said lateral wing members when detached and set up on edge at one end against said central wing member projecting beyond the fuselage and at the other end against the fuselage itself.

2. In an aeroplane, a fuselage, a central member attached thereto, wing members, ball head devices and key-hole slotted devices for movably securing one end of the wing members to the central member and means for detachably securing the other end of the wing members to the fuselage.

In testimony whereof I affix my signature.

HANNS KLEMM.